UNITED STATES PATENT OFFICE.

HERMANN W. VOGEL, OF BERLIN, GERMANY.

METHOD OF MANUFACTURING HIGHLY-SENSITIVE ISOCHROMATIC GELATINE PLATES.

SPECIFICATION forming part of Letters Patent No. 442,741, dated December 16, 1890.

Application filed December 14, 1886. Serial No. 221,521. (No specimens.)

*To all whom it may concern:*

Be it known that I, HERMANN WILHELM VOGEL, a subject of the King of Prussia, German Emperor, residing at Berlin, in the Kingdom of Prussia, Germany, have invented a new and useful Improvement in the Manufacture of Highly-Sensitive Isochromatic Gelatine Plates and Emulsion and Preparation of Baths Serving that Purpose, of which the following is a specification.

In the ordinary sensitive gelatine plates the insoluble silver salts—chloride, bromide, or iodide of silver—either singly or combined, constitute the sensitive agents, and in the practical use of such plates it has been found that these salts, while they are highly sensitive to violet, indigo, and blue rays of the spectrum, are only slightly affected by the green, yellow, and red rays. As a consequence of this, negatives produced from objects which reflect all colors show greater intensity on the parts exposed to the violet, indigo, and blue than on those exposed to the green, yellow, and red or their variations. Pictures produced from such negatives fail to convey an accurate idea of the objects which they represent for the reason that the highly-illuminated green, yellow, and red portions of the object appear comparatively dark as against the equally illuminated violet, indigo, and blue of the same object. To overcome this defect advantage has been taken of the discovery made by me that the salts above mentioned can be made sensitive for the green, yellow, and red by mixing the same with bodies which absorb those rays. These bodies I have called "optical sensitizers," and as such are used aniline-red, aniline-green, cyanine, chinoline-red, eosine, erythrosin, and others; but experience has shown that while these dyes render the plates sensitive to the rays which they absorb the strong action of the blue and violet rays still remains, so that these colors act too intensely on the plates in comparison with their real brightness. For this reason it has been found necessary to diminish the light coming from such portions of the object as reflect the highly-refrangible rays, and a yellow screen or a cell with a yellow solution is usually interposed between the object and the plate for this purpose. This, however, lengthens the time of exposure, and if the screen is not perfectly even it spoils the sharpness (definition) of the picture.

The object of my invention is to produce isochromatic plates which do not require a yellow plate or screen and of which the sensitiveness is much greater than that of the most sensitive plates heretofore used.

My invention is more particularly applicable to gelatine plates, but may be also used with more or less advantage in connection with plates of other kinds.

My invention is based upon the discovery made by me that optical sensitizers of the kind above referred to are rendered far more effective in the presence of silver, and more especially in chemical combination with silver. I make use of this discovery by adding a soluble silver salt—such as nitrate of silver—to the optical sensitizer required in a particular case and by using the compound either as an integral part of the emulsion or by immersing the ordinary gelatine plate in a bath containing such compound in solution.

My invention therefore embraces, first, a new compound which constitutes an improved optical sensitizer; second, the use of the new optical sensitizer in connection with isochromatic photography, and, third, a gelatine or other photographic plate sensitized and rendered isochromatic by the application of my improved optical sensitizer.

Under the first head I make a compound of a suitable dye with silver, and I can do this in a variety of ways, some of which I will presently describe.

My preferred method is as follows: I first produce a chemical combination of an eosine dye (a derivative of fluorescein) with silver by mixing eosine, erythrosin, chrysolin, uranin, primrose, cyanosin, rose-Bengale, or any other derivative of fluorescein, with a solution of nitrate of silver in about the proportion of their equivalents. This gives rise to a new body known as "silver eoside," which is a union of silver with the particular derivative of fluorescein employed, and is a true salt, since the derivatives of fluorescein are all acids. This silver eoside precipitates as a red powder, and is collected on a filter and washed, if necessary. I do not, however, limit myself to this particular mode of producing silver eoside, since this forms no part of my invention. Any other method of making the silver eoside may be employed. The silver eoside is then dissolved in ammonia or glacial acetic acid, and the solution thus obtained constitutes a highly-sensitive optical sensitizer, and it will be understood that it is an optical sensitizer for those rays which the fluorescein derivatives employed absorbs. I have also found that in the production of a silver eoside I may with advantage employ more than one dye, and that the product then obtained will be an optical sensitizer for more than one kind of rays, as will be clear to those familiar with the art.

The solution of silver eoside described is a complete article of manufacture. It may be shipped and sold in the market, and is distinguishable from all other articles of manufacture.

The quantities of ingredients employed are very variable, according to the purity of the same and according to the results aimed at. Nor is it necessary to produce the silver eoside by a separate and distinct process in the form of a precipitate, since it may be obtained by one process in solution as follows: Mix fifty volumes of a solution of one part of any eosine dye in one thousand volumes of water, one volume of a solution of nitrate of silver in twenty volumes of water and one volume of ammonia; but it will be understood that the quantities here named may be and will be departed from, according to the nature of the particular case, the main object being to produce a compound of an eosine dye with silver in solution. This compound may be used either as an integral part of the emulsion or it may be used as a bath for ordinary gelatine plates, in which case it is diluted with from fifty to one hundred volumes of water. In both cases the plates are rendered isochromatic and highly sensitive.

Another method of producing the optical sensitizer consisting of a dye and silver is to mix the solutions of dyes which do not combine with silver with soluble silver salts such as nitrate of silver; and still another method is to add such dyes to the solutions of eosides of silver above described. Thus I can improve the sensitiveness of the solutions of eosides of silver for red by the addition to the same of chinoline-red, cyanine, corulein, coralline, and other dyes which do not combine with silver. As an example of this I give the following: Fifty volumes of chinoline-red or cyanine or mixtures of both in solution of one per one thousand parts of water or alcohol, one-half to three volumes of nitrate of silver in a solution of one to twenty, and fifteen volumes of ammonia. Of this compound a suitable amount is added to the ordinary emulsion which is to be rendered isochromatic, or it is diluted with from five hundred to one thousand volumes of water, and is used as a bath for ordinary gelatine plates.

Under the second head of my invention I employ my improved optical sensitizers either in the manner hereinbefore described or by producing the compound of silver with a suitable dye upon the plate itself. The latter object is attained by immersing ordinary gelatine plates, first, in a bath of a solution of about one part of a silver salt to one thousand of water and then in a solution of any eosine-dye or mixture of eosine-dyes. To this second bath other dyes, which do not belong to the eosine group may be added. The plate is then dried, and has in this condition formed upon it or in the body of its sensitive film the compound of silver and dye, which constitutes my improved optical sensitizer.

It will be clear that the two baths may be used in the reversed order and that the quantity of the dye is variable, according to the nature of the particular case.

Under the third head of my invention I obtain a gelatine or other sensitive plate having upon its surface or within the body of its sensitive film a compound of silver and dye, either in chemical combination or in mixture, or both, whereby the plate becomes isochromatic and highly sensitive. Such plates may be shipped and sold to photographers or amateurs, and constitute complete articles of manufacture, being distinguishable from all other articles.

In the manufacture of my improved optical sensitizer and of my improved isochromatic plates I may substitute eoside of lead or of other metals for eoside of silver, or I may mix these salts in any proportions, without departing from the fundamental idea of my invention, which has for its ultimate object the preparation of a highly-sensitive isochromatic plate. Thus while in the foregoing description I have spoken of eoside of silver only, I wish it to be understood that my invention is not limited to the application of that salt, but comprises the eosides of all metals or mixtures thereof as equivalents.

Having fully described my invention, what I desire to claim, and to secure by Letters Patent, is—

1. A sensitive isochromatic photographic plate consisting of a base, a sensitive film, and a compound of silver, and a dye or dyes held by the film, substantially as described.

2. A sensitive isochromatic photographic plate consisting of a base, a sensitive film, and the chemical combination of silver, with a dye or dyes held by the film, substantially as described.

3. A sensitive isochromatic photographic plate consisting of a base, a sensitive film, and an eoside or eosides of silver held by said film, substantially as described.

4. A sensitive isochromatic photographic plate consisting of a base, a sensitized gelatine film, and a compound of silver, and a dye or dyes held by the film, substantially as described.

5. An optical sensitizer for isochromatic photography, consisting of a compound of silver and a dye or dyes, and a solvent, substantially as described.

6. An optical sensitizer for isochromatic photography, consisting of the chemical combination of silver, with an eosine dye or dyes, and a solvent, substantially as described.

7. An optical sensitizer for isochromatic photography, consisting of a mixture of a solution of nitrate of silver, an eosine-dye, and ammonia, substantially as described.

8. The process of making sensitive isochromatic photographic plates, which consists in connecting with the substance which constitutes the film a compound of silver and a dye or dyes, substantially as described.

9. The process of making sensitive isochromatic photographic plates, which consists in connecting the chemical combination of silver and an eosine dye or dyes with the substance which constitutes the film, substantially as described.

10. The process of rendering photographic gelatine plates isochromatic, which consists in subjecting the plates to baths of nitrate of silver and a dye or dyes in succession, substantially as described.

11. The process of rendering photographic gelatine plates isochromatic, which consists in subjecting the plates to baths of nitrate of silver and an eosine dye or dyes in succession, substantially as described.

In testimony whereof I have hereunto subscribed my name in the presence of two subscribing witnesses.

H. W. VOGEL.

Witnesses:
 B. ROI,
 M. W. MOORE.